(12) United States Patent
Odishoo

(10) Patent No.: US 8,573,442 B2
(45) Date of Patent: Nov. 5, 2013

(54) METHOD AND DEVICE FOR INVENTORY CONTROL OF A DISPENSED LIQUID

(76) Inventor: Pera Odishoo, Chicago, IL (US)

(*) Notice: Subject to any disclaimer, the term of this patent is extended or adjusted under 35 U.S.C. 154(b) by 1419 days.

(21) Appl. No.: 12/095,786

(22) PCT Filed: Nov. 30, 2006

(86) PCT No.: PCT/US2006/061405
§ 371 (c)(1),
(2), (4) Date: Oct. 15, 2008

(87) PCT Pub. No.: WO2007/065129
PCT Pub. Date: Jun. 7, 2007

(65) Prior Publication Data
US 2009/0134183 A1    May 28, 2009

Related U.S. Application Data

(60) Provisional application No. 60/741,610, filed on Dec. 2, 2005.

(51) Int. Cl.
*B67D 7/24* (2010.01)
*B67D 7/22* (2010.01)
*B67D 1/00* (2006.01)

(52) U.S. Cl.
USPC ............ 222/30; 222/36; 222/41; 222/153.09; 222/543

(58) Field of Classification Search
USPC ........... 222/1, 30, 36, 38, 41, 153.09, 153.01, 222/556, 557, 543, 477
See application file for complete search history.

(56) References Cited

U.S. PATENT DOCUMENTS

| | | | | |
|---|---|---|---|---|
| 396,021 A | * | 1/1889 | Barker | 235/94 R |
| 1,447,117 A | * | 2/1923 | Balison et al. | 222/556 |
| 2,400,328 A | * | 5/1946 | Zehring | 235/94 R |
| 2,473,462 A | * | 6/1949 | Wortman | 222/38 |
| 2,580,292 A | * | 12/1951 | Geary et al. | 222/38 |
| 2,647,660 A | * | 8/1953 | Arena | 222/38 |
| 2,754,034 A | * | 7/1956 | Gonzales et al. | 222/335 |
| 2,808,178 A | * | 10/1957 | Di Grado et al. | 222/38 |
| 2,808,179 A | * | 10/1957 | Di Grado et al. | 222/38 |
| 3,164,300 A | * | 1/1965 | Dousette | 222/153.06 |
| 3,170,597 A | | 2/1965 | Reichenberger | |

(Continued)

FOREIGN PATENT DOCUMENTS

| | | |
|---|---|---|
| DE | 272 214 | 7/1912 |
| DE | 198 41 705 | 5/2000 |

(Continued)

OTHER PUBLICATIONS

Supplementary European Search Report, European Patent Application No. EP 06 84 6419, mailed Jun. 24, 2010.

*Primary Examiner* — Kevin P Shaver
*Assistant Examiner* — Stephanie E Williams
(74) *Attorney, Agent, or Firm* — Mitchell Law PLLC; Matthew W. Mitchell

(57) ABSTRACT

A method and device are provided for controlling and reconciling a liquid inventory, such as a volume of liquid dispensed from a container. The device secures a pour spout for dispensing a predetermined amount of liquid to a container opening, such that the spout may not be removed without detection. The device includes a counting mechanism to count and indicate the total number of pours from the container for use in sales and inventory reconciliation.

18 Claims, 3 Drawing Sheets

(56) References Cited

U.S. PATENT DOCUMENTS

| | | | |
|---|---|---|---|
| 3,181,729 A * | 5/1965 | Milonas et al. | 222/36 |
| 3,419,187 A | 12/1968 | Bazarnic | |
| 3,467,427 A * | 9/1969 | Moberg | 292/322 |
| 3,597,803 A * | 8/1971 | Van Neil | 24/16 PB |
| 3,920,149 A | 11/1975 | Fortino et al. | |
| 3,993,218 A | 11/1976 | Reichenberger | |
| 4,225,051 A | 9/1980 | Faudou et al. | |
| 4,278,186 A | 7/1981 | Williamson | |
| RE31,434 E | 11/1983 | Reilly | |
| 4,436,223 A * | 3/1984 | Wilson | 222/36 |
| 4,506,415 A * | 3/1985 | Swift | 24/16 PB |
| 4,563,739 A | 1/1986 | Gerpheide et al. | |
| 4,651,901 A * | 3/1987 | Ozdemir | 222/567 |
| 4,730,615 A * | 3/1988 | Sutherland et al. | 606/215 |
| 4,736,871 A | 4/1988 | Luciani et al. | |
| 4,896,852 A * | 1/1990 | Akema | 248/74.3 |
| 5,209,358 A | 5/1993 | Simard | |
| 5,255,819 A | 10/1993 | Peckels | |
| 5,295,611 A | 3/1994 | Simard | |
| 5,318,197 A | 6/1994 | Martindale et al. | |
| 5,379,916 A | 1/1995 | Martindale et al. | |
| 5,505,349 A | 4/1996 | Peckels | |
| 5,507,411 A | 4/1996 | Peckels | |
| 5,603,430 A | 2/1997 | Loehrke et al. | |
| D386,350 S | 11/1997 | Mogadam | |
| 5,702,032 A | 12/1997 | Loehrke | |
| 5,731,981 A | 3/1998 | Simard | |
| 6,036,055 A | 3/2000 | Mogadam et al. | |
| 6,354,468 B1 | 3/2002 | Riek | |
| 6,409,046 B1 | 6/2002 | Peckels | |
| 6,450,406 B2 | 9/2002 | Brown | |
| 6,504,481 B2 | 1/2003 | Teller | |
| 6,616,037 B2 | 9/2003 | Grimm et al. | |
| 6,658,703 B1 * | 12/2003 | Teagno et al. | 24/16 PB |
| 6,672,510 B2 | 1/2004 | Sauve | |
| 6,883,683 B1 | 4/2005 | Cunningham et al. | |
| 6,892,166 B2 | 5/2005 | Mogadam | |
| 2003/0034392 A1 | 2/2003 | Grimm et al. | |
| 2005/0200490 A1 | 9/2005 | Teller | |

FOREIGN PATENT DOCUMENTS

| | | |
|---|---|---|
| EP | 0 098 042 | 1/1984 |
| GB | 2 174 684 | 11/1986 |
| WO | 01/00957 | 1/2001 |

* cited by examiner

METHOD AND DEVICE FOR INVENTORY CONTROL OF A DISPENSED LIQUID

RELATED APPLICATIONS

The present application claims the benefit of U.S. Provisional Patent Application No. 60/741,610, filed Dec. 2, 2005, the entire contents of which are hereby incorporated by reference.

FIELD OF THE INVENTION

The present disclosure relates to security devices, and more particularly, to a method and an apparatus for controlling the inventory of a liquid dispensed from a container.

BACKGROUND

Each year, businesses such as bars and restaurants purchase and sell a vast quantity of beverages including alcoholic beverages (e.g., beer, wine, and liquor) and non-alcoholic beverages (e.g., soda). Typically, alcoholic beverages such as wine and mixed drinks include alcohol in the form of liquor dispensed from a bottle. For example, a glass of wine is poured directly from a bottle, and similarly, a mixed drink such as a martini primarily includes gin or vodka poured from a bottle. To be profitable and to satisfy customers at the same time, a proper amount of alcohol must be dispensed from the bottle for each drink.

One aspect of controlling cost in distribution of alcoholic and/or non-alcoholic beverages is to ensure that the intended volume is dispensed from a bottle. For example, a beverage preparer such as a bartender or a waiter may inadvertently or intentionally pour more or less than the proper amount of alcohol when preparing a drink. To control the portion size of alcohol dispensed from a bottle, various pouring spouts such as "posi-pourers" are available to ensure the amount dispensed during a single act of dispensing is a predetermined volume (e.g., Conry, U.S. Pat. No. 3,321,113). For example, a pouring spout may be configured to dispense a predetermined volume of 1 oz. per pour from a bottle of vodka for a martini.

Although such predetermined volume pouring spouts may help the server to pour the proper amount from the bottle, a pouring spout used alone offers no way to prevent unauthorized dispensing from the bottle. For example, a server may simply tip the bottle additional times to pour a larger serving, or even remove the pourer entirely. Such unauthorized dispensing is tantamount to inventory theft and impacts establishments as lost sales and profit. Additionally, such inventory theft is exacerbated since it is difficult to detect. In one example, it is known that with a clear alcohol, an individual may remove the pouring spout, pour the alcohol out of the bottle, refill the bottle with water, and then reinsert the spout into the bottle. As a result, the missing alcohol may not be detected until an employee closely inspects the bottle, or in a worse case, when a customer complains of receiving a "weak" drink.

In another example, the preparer may easily over-dispense the proper amount of liquor, which may result in the customer consuming more alcohol than he or she intended thereby causing unintentional intoxication and increasing the risk of drunk driving. Similarly, the preparer may serve a drink and pocket the customer's payment instead of ringing it up on a cash register or point of sale terminal and depositing the payment. This type of theft (monetary and inventory) is also difficult to detect since it requires a combined reconciliation of sales and inventory. In a bar or restaurant setting, such reconciliation is often accomplished by comparing sales receipts, sales reports, or the like with payments (i.e., cash and credit card) and a visual inspection of beverage inventory. Often, to prevent theft of payments and unauthorized dispensing and improve sales and profitability, establishments resort to employing an individual to specifically oversee and closely supervise the work of one or more beverage preparers. However, it is disadvantageous to employ individuals to specifically perform such a task since an individual cannot be constantly vigilant, and in a worst case, may be complicit with a beverage preparer in the theft of inventory and monies.

Therefore, a need exists for an inexpensive, easy to use device that prevents unauthorized removal of a pour spout. Additionally, the device facilitates inventory control and sales and inventory reconciliation for a liquid dispensed from a container.

SUMMARY

In accordance with the described embodiments, a method and device for inventory control of a liquid dispensed from a container is provided. The device is sized and shaped to cooperate with a dispenser, such as a pouring spout for dispensing a predetermined amount of liquid, engaged to the opening of a container of liquid, such as a bottle. The device includes a base portion having a first end with a ring member, which secures the dispenser to the opening of a container, and a second end with a container attachment member that affixes the device to the container. The base portion includes indicia disposed thereon so that a container to which the device is affixed may be identified for sales and inventory purposes. The base portion also includes a counting mechanism that is operative to detect when the container is adjusted from a non-dispensing position to a dispensing position. Further, the counting mechanism may provide an indication of the number of times the container is adjusted between positions.

In some aspects, a security device is provided for sealing a pour spout to a liquor bottle, the security device including a first portion having a base portion and a ring member, the ring member extending from a first end of the base portion, the ring member being configured to surround a portion of the pourer. The security device also including a counting mechanism coupled to the base portion, the counting mechanism operative to detect the bottle adjusting from a first position to a second position, one of the positions being a position to dispense liquor from the bottle. The security device further including a container attachment member extending from a second end of the base portion, the attachment member including a strap configured to surround a portion of the bottle.

In some aspects, a device for securing a pour spout to a container opening is provided. The pour spout is configured to dispense a predetermined amount of liquid per pour and includes a first portion having a base portion and a ring member, the ring member extending from a first end of the base portion, the ring member being configured to surround a portion of the pour spout. The device also including a container attachment member extending from a second end of the base portion, the container attachment member permanently affixing the device to the container such that removal of the pour spout is inhibited.

In some aspects, a method for inventory control of a liquid dispensed from a container is provided. The method includes providing a device for sealing a dispenser to a container having a known quantity of liquid, the dispenser configured to dispense a predetermined amount of liquid per pour, and the device operative to count and indicate the total number of pours. The method also includes disposing the device onto the dispenser to engage with at least a portion of the dispenser, securing the device to a portion of the container such that removal of the dispenser from the container is inhibited, detecting the container adjusting from a first position to a second position, the second position being a position to pour liquid from the container, and indicating the total number of pours via a display coupled to the device.

Figure 1:
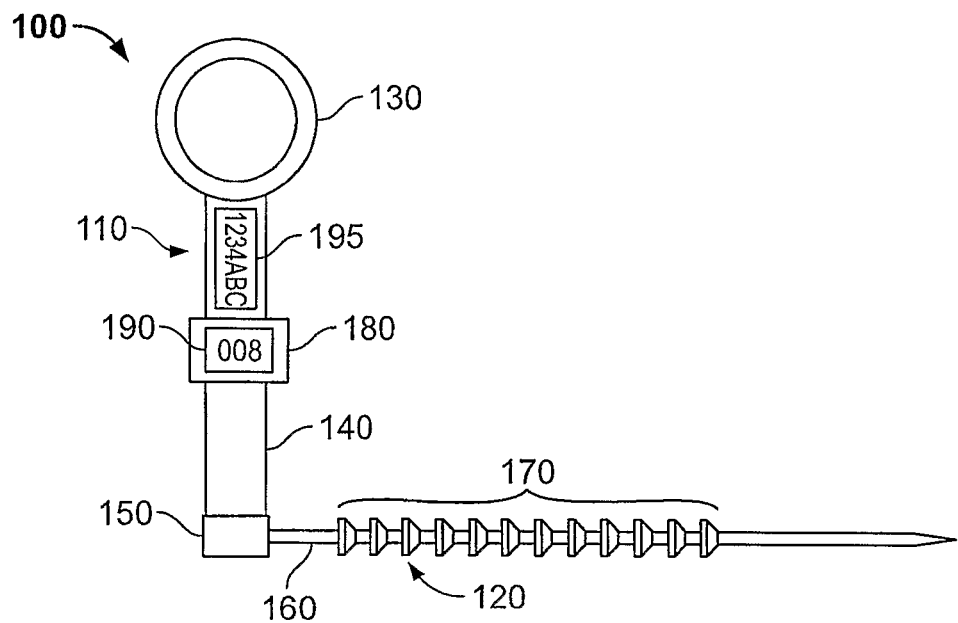
FIG. 1 is a top view of a first embodiment of the invention.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

Figure 2:
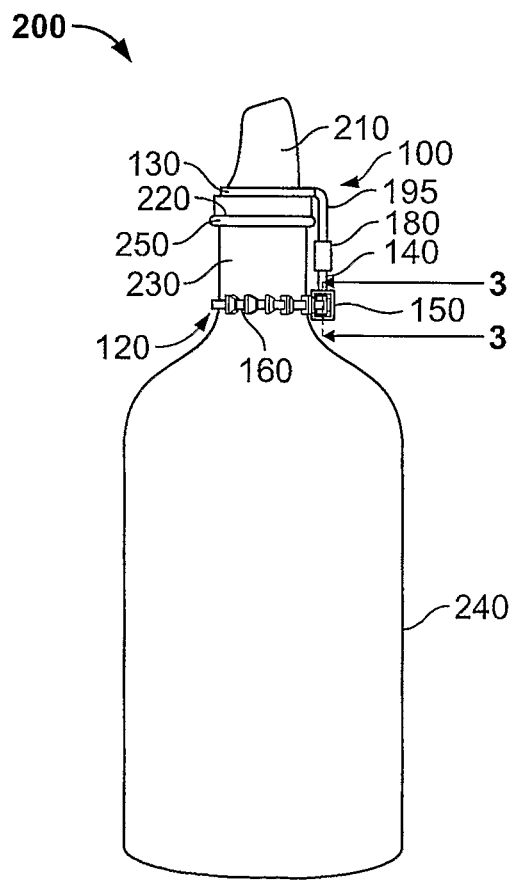
FIG. 2 is an elevation view of the embodiment of FIG. 1 engaged to a container.

Referring now to FIGS. 1 and 2, a security seal device 100 is shown that generally includes a first portion 110 and a container attachment member 120. The device 100 may be molded, formed, or otherwise fabricated of a variety of materials such as, but not limited to, nylon or other suitable plastic. As shown in FIG. 1, the first portion 110 includes a ring member 130 and a base portion 140. As illustrated, the shape of the ring member 130 is generally annular, however, the ring member 130 may be sized and shaped otherwise to suitably engage with one or more various dispenser 210 (FIG. 2) such that it is operative to serve as a retaining collar around at least a portion of the dispenser 210. For example, as shown in FIG. 2, the ring member 130 may encircle a portion of a pouring spout inserted into the opening of a bottle. The base portion 140 is generally planar and rectangular shaped as illustrated and includes first and second ends. The ring member 130 extends from the first end of the base portion 140 whereas the container attachment member 120 extends from the second end of the base portion 140. The container attachment member 120 is configured to permanently attach the device 100 to the container 200. In this way, the attachment member 120 is operative to inhibit removal of the device 100 and the dispenser 210 from the container 200.

Referring now to FIG. 2, typically, the container 200 includes an opening 220 for dispensing a liquid within the container 200. The dispenser 210 is known in the art and is operable to dispense a predetermined amount of liquid per pour (i.e., not "free-pouring") when coupled to the opening 220. Typically, the dispenser 210 is friction fit to the opening 220 and removable therefrom. Additionally, the container 200 may include a neck portion 230, and a body portion 240 as shown. Further, the neck portion 230 may include an integral collar 250 or reinforcing member that prevents accidental breakage of the neck portion 230 during pouring. For example, if the neck portion 230 were to make forceful contact with glass barware, the barware should break or crack instead of the neck portion 230 such that the container 200 does not become contaminated with container material (e.g., shards of broken glass). The body portion 240 of the container 200 is sized and shaped to hold liquid, such as an alcoholic beverage or other liquid, and initially includes therein a known amount of liquid. To ensure that the dispenser 210 is not removed such that liquid must be dispensed by way of the dispenser 210, the device 100 is sealed to the container 200 by the container attachment member 120.

Figure 3:
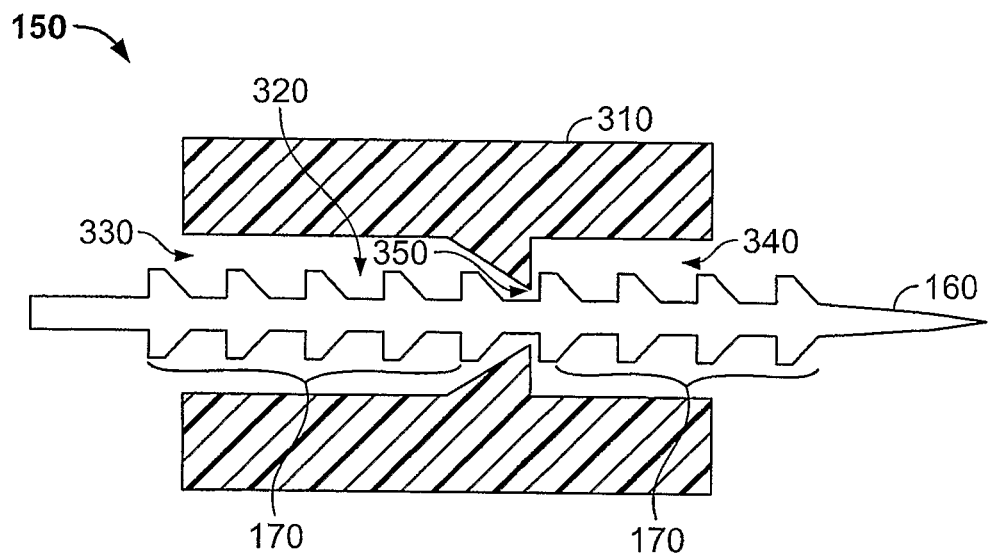
FIG. 3 is a cross-sectional view of the fastening member of the embodiment of FIG. 1.

As shown by the embodiment illustrated in FIGS. 1 and 2, the container attachment member 120 may include a mechanical arrangement such as a fastening member 150 and a strap member 160. Referring to FIG. 3, the fastening member 150 generally includes a head 310, a passage 320, an inlet portion 330, and an outlet portion 340. The inner surface of the passage 320 may taper inwardly from the inlet portion 330 to form a slot 350. Although the slot 350 disclosed herein is located proximate to a middle portion of the passage 320, the slot may be located at any suitable point along passage 320.

The length of the strap member 160 is such that the device 100 may be adapted to containers 200 of various sizes. As shown in FIGS. 2 and 3, the strap member 160 may include a plurality of ratchet teeth 170 to engage with the fastening member 150. When the strap member 160 encircles a portion of the container 200 (i.e., the neck portion 230 as illustrated in FIG. 2), and is threaded through the fastening member 150 and tightened, a snug fit is achieved against the outer surface of the container 200. Accordingly, the fastening member 150 affixes the strap member 160 to the container 200. That is, the strap member 160 is inserted into the head 310 of the fastening member 150 and through the inlet portion 340. The ratchet teeth 170 advance through the slot 350 until the container attachment member 120 is securely fastened to the container 200. To prevent reverse movement of the strap member 160 in the head 310, the slot 350 may cooperate with at least one of the plurality of ratchet teeth 170 on the strap 160 when the strap 160 is pulled through the head 310. As a result, the sealing element 100 and the dispenser 210 may not be removed from the container 200 without breaking the device 100. After the device 100 is affixed to the container 200, any excess length of strap member 160 protruding from the outlet 340 of the head 310 may be trimmed off to maintain a neat appearance. While a particular fastening member 150 is shown, any suitable cable tie head, pawl and ratchet arrangement can be used in lieu of the system displayed so long as the strap 160 is nonreleasable after it is fully engaged in the fastening member 150. Additionally, the container attachment member 120 and base portion 140 should cooperate to inhibit or completely prevent the upward movement of the device 100 such that the dispenser 210 may not be removed from the container opening 220. For example, the length of the base portion 140 between its first and second ends should be shorter than the portion of the dispenser 210 (e.g., a vent tube or liquid tube not shown) inside the container 200.

To assist in identifying tampering with and/or removal of the device 100, the device 100 may be marked with indicia. Referring back to FIG. 1, the device 100 includes a unique identifier 195 such that if the device 100 is destructively removed and replaced with another similar device 100, the removal of the first device 100 will be evident. As such, the identifier 195 should complicate attempts to counterfeit the device 100 and/or to substitute a new device 100 for the container 200 after tampering with the device 100. The identifier 195 may be, but is not limited to, a numeric identifier, an alphanumeric identifier, a bar code, or other suitable unique identifying means. For example, the identifier 195 may be a serial number disposed on the base portion 140. Although the seal identifier 195 is illustrated as located on the base portion 140, it may be located elsewhere where appropriate, such as on the ring member 130, fastening member 150, or elsewhere on the device 100.

As previously mentioned, the dispenser 210 is configured to dispense a predetermined volume of a liquid (e.g., 1 oz., 1.5 oz., etc.) from the container 200 per each pour. For example, the dispenser 210 may be configured to dispense ½ oz. of alcohol from the container 200 and to automatically stop after dispensing that amount. To monitor the number of times that the predetermined amount of liquid is dispensed from the container 200, the device 100 may also include a counting mechanism 180, which is illustrated in FIGS. 1 and 2 as operatively coupled to the base portion 140. The counting mechanism 180 may include a gravity-controlled switch (e.g., a mercury switch), or other suitable position/motion switch known in the art that is orientation and/or motion sensitive. Further, the counting mechanism 180 may include a display 190 such as, but not limited to, a liquid crystal display (LCD), a light emitting diode (LED), or mechanically rotatable reels. The counting mechanism 180 detects the container 200 adjusting from a non-pouring position to a pouring position, and indicates the total number of adjustments between positions via the display 190 by incrementing a counter or the like. Ideally, the counting mechanism 180 should be relatively inexpensive to be considered disposable, however, the counting mechanism 180 may alternatively be removably coupled to the device 100' and reusable with another device 100.

To illustrate this concept, the container 200 may be tilted or tipped to dispense a particular volume of the liquid contents within the container 200. The counting mechanism 180 is triggered to increment the number of displayed adjustments by one to account for the change in orientation of the container 200. As such, at any instance, the display 190 indicates the total number of servings dispensed from the container 200. Ideally, each serving is sold (assuming minimal spillage and waste), and therefore, the number shown on the display 190 may be used to reconcile monies (i.e., cash and credit receipts) received to the liquid inventory. For example, a bottle may hold 32 oz. of vodka, and a pouring spout used with the bottle is configured to dispense 1 oz. of vodka per pour. When the bottle is empty, a display should indicate thirty two (32) for the number of pours. Assuming that all drinks containing 1 oz. of vodka cost $10 each, when the bottle is empty, the person making vodka drinks should have cash and credit payments equaling $320 ($10×32). As a result, the number of pours indicated on the display 190 may be compared to sales receipts, cash, and records to reconcile and determine discrepancies between liquid volume inventory and sales. In this way, drink preparers such as bartenders may be held accountable for missing liquid inventory and cash.

Figure 4:
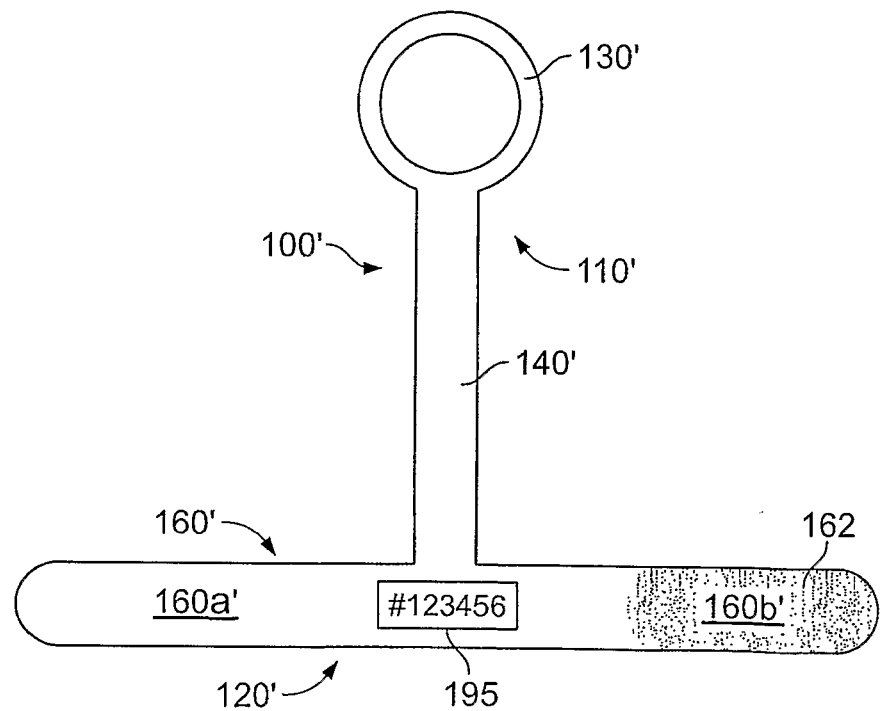
FIG. 4 is a top view of a second embodiment of the invention.
Figure 5:
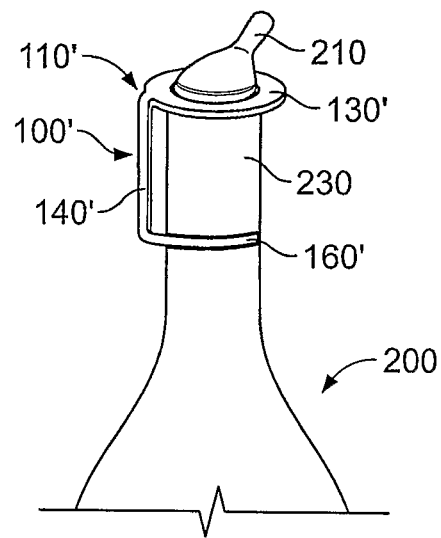
FIG. 5 is an elevation view of the embodiment of FIG. 4 engaged to a container.
Figure 6:
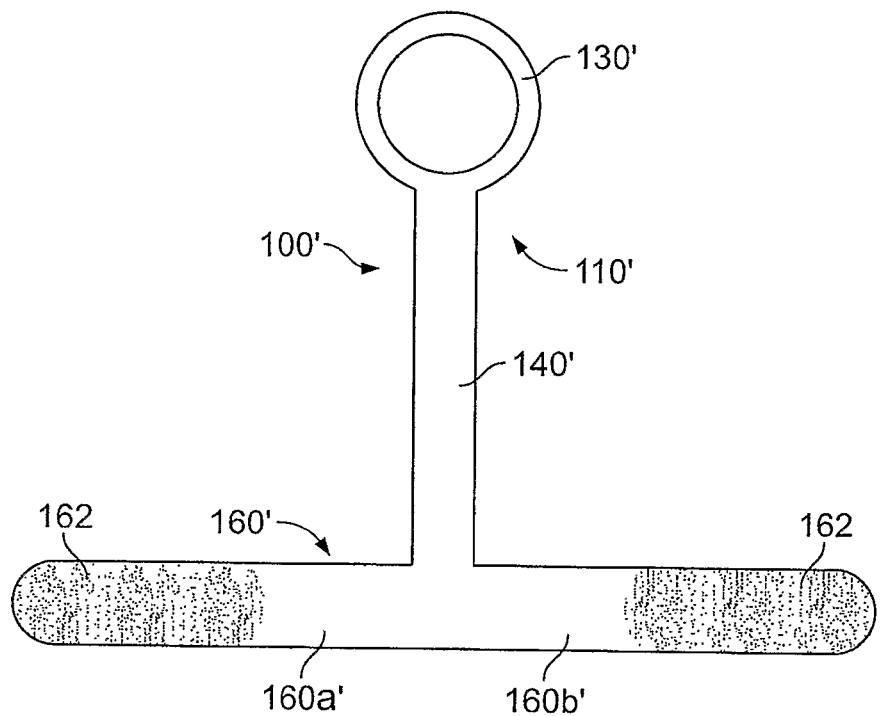
FIG. 6 is a bottom view of the second embodiment of the invention shown in FIG. 4.

Referring now to FIGS. 4-6, a second embodiment of the device is described. As shown in FIG. 4, the second embodiment of the device 100' is similar to the first embodiment of the device 100, however, device 100' is generally T-shaped whereas device 100 is generally L-shaped. Device 100' includes a first portion 110' and a container attachment member 120'. The device 100' may be molded, formed, or otherwise fabricated of a relatively thin film-like material such as, cellophane or the like. It will be understood that if the device 100' is tampered with, the device 100' will break, however, the device 100' should not break due to normal handling. As shown, the first portion 110' includes a ring member 130' and a base portion 140'. As illustrated, the shape of the ring member 130' is generally annular, however, the ring member 130' may be sized and shaped otherwise to suitably engage with one or more various dispenser 210 (FIG. 2) such that it is operative to serve as a retaining collar around at least a portion of the dispenser 210. For example, the ring member 130' may encircle a portion of a pouring spout inserted into the opening of a bottle. The base portion 140' is generally planar and rectangular shaped as illustrated and includes first and second ends. The ring member 130' extends from the first end of the base portion 140' whereas the container attachment member 120' extends from the second end of the base portion 140'. The container attachment member 120', which includes a strap member 160' having two branches 160a' and 160b', is configured to permanently attach the device 100' to the container 200. With particular reference to FIG. 6, branches 160a', 160b' include an adhesive 162 on one surface to bond the device 100' to the container 200. With particular reference to FIG. 5, one of the branches 160a' or 160b' (160b' in the illustrated embodiment) includes an adhesive 162 on a surface thereof such that the branches 160a' and 160b' can be wrapped around the bottle and adhesively secured to one another via the adhesive 162. The branches 160a' and 160b' are secured to each other tightly around the bottle so that the device 100' cannot be slipped over the neck and head of the bottle. In these ways, the attachment member 120' is operative to inhibit removal of the device 100', and consequently inhibit removal of the dispenser 210 from the container 200.

To assist in identifying tampering with and/or removal of the device 100', the device 100' may be marked with indicia. As shown, the device 100' includes a unique identifier 195 such that if the device 100' is destructively removed and replaced with another similar device 100', the removal of the first device 100' will be evident. As such, the identifier 195 should complicate attempts to counterfeit the device 100' and/or to substitute a new device 100' for the container 200 after tampering with the device 100'. The identifier 195 may be, but is not limited to, a numeric identifier, an alphanumeric identifier, a bar code, or other suitable unique identifying means. For example, the identifier 195 may be a serial number disposed on the base portion 140', although the seal identifier 195 may be located elsewhere where appropriate. Additionally, similar to the first embodiment, device 100' may include the counting mechanism 180 for counting and indicating the number of times that a predetermined amount of liquid is dispensed from the container 200, such that drink preparers such as bartenders may be held accountable for missing liquid inventory and cash.

A method for controlling inventory of a liquid dispensed from a container (such as the one shown as 200 in FIG. 2) that may be applied by implementing the devices 100, 100' is now described. Although a particular order of steps is disclosed, these steps can be performed in other suitable logical sequences. The disclosed method is merely provided as an example of one way to use the device 100, 100' and should be in no way limiting to other uses of the device 100, 100'. For simplicity, since the method is equally applicable to each of the embodiments, therefore, only one set of reference numerals is used hereafter. Accordingly, this use of one set of reference numerals is not to be considered limiting to one particular embodiment.

The method begins with securing the device 100 to a container 200 having a dispenser 210, which is configured to dispense a predetermined volume. The ring member 130 of the device 100 is positioned onto the dispenser 210 to surround a portion thereof. The base portion 140 may be disposed adjacent to the container 200. That is, the ring member 130 and the base portion 140 may form an approximate 90° angle such that the ring member 130 and strap member 160 may be oriented generally parallel. Now, the strap member 160 of the container attachment member 120 is configured to wrap around a portion of the container 200 and is permanently affixed thereto such that the dispenser 210 may not be removed from the container 200 without destructively removing (i.e., breaking) the device 100.

Thus affixed, the device 100 monitors the number of pours from the container 200 via the counting mechanism 180. In particular, the counting mechanism 180 detects movement of the container 200 from a non-pouring position to a pouring position. The device 100 indicates the total number of pours (i.e., movements from the non-pouring position to the pouring position) via the display 190. Comparing the total number of pours to sales receipts, cash, and reports. Reconciling sales information to the total number of pours to determine discrepancies in cash and liquid inventory, thereby preventing theft and unauthorized dispensing. As a result, the contents within the container 200 may be dispensed in a controlled manner and monitored by the sealing element 100.

All references, including publications, patent applications, and patents, cited herein are hereby incorporated by reference to the same extent as if each reference were individually and specifically indicated to be incorporated by reference and were set forth in its entirety herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. For example, although the device and method disclosed herein is particularly well suited for bottles of liquor, persons of ordinary skill in the art will readily appreciate that the teachings herein are in no way limited to such bottles. It should be appreciated that the device and method may be employed to containers of other contents, such as chemicals and medicine. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A security device for sealing a pour spout to a liquor bottle, the security device comprising:
    a first portion having a base portion and a ring member, the ring member extending from a first end of the base portion, the ring member being configured to secure the pourer to the bottle;
    a counting mechanism coupled to the base portion, the counting mechanism operative to detect the bottle adjusting from a first position to a second position, one of the positions being a position to dispense liquor from the bottle; and
    a container attachment member extending from a second end of the base portion, the attachment member including a strap configured to surround a portion of the bottle, wherein the strap further comprises a plurality of ratchet teeth and the container attachment member further comprises a fastening member configured to affix the strap around the container in a locked loop by engaging at least one of the plurality of ratchet teeth.

2. The device of claim 1, wherein the base portion comprises a unique identifier corresponding to the device.

3. The device of claim 2 wherein the identifier is one of a numeric identifier, an alphanumeric identifier, or a bar code.

4. The device of claim 1, wherein the device is fabricated of a plastic material.

5. The device of claim 1 wherein the counting mechanism includes a switch.

6. The device of claim 1 wherein the counting mechanism includes a display to indicate a number of adjustments of the bottle from the first position to the second position.

7. The device of claim 6 wherein the display comprises a liquid crystal display screen.

8. The device of claim 6 wherein the display comprises at least one mechanically rotatable reel.

9. A device for securing a pour spout to a container opening, the pour spout configured to dispense a predetermined amount of liquid per pour, the device comprising:
    a first portion having a base portion and a ring member, the ring member extending from a first end of the base portion, the ring member being configured to surround a portion of the pour spout;
    a container attachment member extending from a second end of the base portion, the container attachment member permanently affixing the device to the container such that removal of the pour spout is inhibited, wherein the container attachment member includes a strap member having a plurality of ratchet teeth, the strap member being configured to surround a portion of the container, and a fastening member configured to affix the device to the container by engaging at least one of the plurality of ratchet teeth on the strap member to form a locked loop around the container; and
    wherein the container attachment member comprises one or more branches having adhesive on a side thereof for bonding the device to the container.

10. The device of claim 9 further comprising a unique identifying indicia.

11. The device of claim 9 further comprising a counting mechanism operative to detect when the container is adjusted from a non-pouring position to a pouring position.

12. The device of claim 11 wherein the counting mechanism includes a display to indicate a total number of adjustments between the positions.

13. The device of claim 9, wherein the device is fabricated of a plastic material.

14. The device of claim 9, wherein the device is fabricated of a thin material.

15. The device of claim 14 wherein the material comprises cellophane.

16. The device of claim 9 wherein the container attachment member comprises two branches, at least one of the two branches including adhesive on a side thereof for bonding the two branches together.

17. A method for inventory control of a liquid dispensed from a container, the method comprising:
    providing a device for sealing a dispenser to a container having a known quantity of liquid, the dispenser configured to dispense a predetermined amount of liquid per pour, and the device operative to count and indicate the total number of pours;

disposing the device onto the dispenser to engage with at least a portion of the dispenser, wherein the device includes a container attachment member extending from a second end of the base portion, the attachment member having a plurality of ratchet teeth and a fastening member;

securing the device to a portion of the container such that removal of the dispenser from the container is inhibited, the securing step additionally comprising engaging at least one of the plurality of ratchet teeth to the fastening member to affix the device to the container;

detecting the container adjusting from a first position to a second position, the second position being a position to pour liquid from the container; and indicating the total number of pours via a display coupled to the device.

18. The method of claim 17 further comprising reconciling sales information to a total number of pours indicated by the display to determine if discrepancies exist with respect to sales and a liquid inventory.

\* \* \* \* \*